United States Patent [19]

Nishikawa et al.

[11] 4,298,102

[45] Nov. 3, 1981

[54] SHOCK ABSORBER FOR VEHICLE USE

[75] Inventors: Masao Nishikawa, Tokyo; Hitoshi Yamamoto, Asaka, both of Japan

[73] Assignee: Honda Giken Kogyo Kabushiki Kaisha, Tokyo, Japan

[21] Appl. No.: 91,766

[22] Filed: Nov. 6, 1979

Related U.S. Application Data

[63] Continuation of Ser. No. 877,851, Feb. 15, 1978, abandoned.

[30] Foreign Application Priority Data

Mar. 22, 1977 [JP] Japan .................................. 52-31333

[51] Int. Cl.³ .............................................. F16F 9/44
[52] U.S. Cl. .............................. 188/319; 16/DIG. 39; 137/493.9; 188/322.15
[58] Field of Search ............... 188/285, 299, 319, 322; 137/493, 493.9, 843; 16/DIG. 39, 51, 52, 66

[56] References Cited

U.S. PATENT DOCUMENTS

| | | | |
|---|---|---|---|
| 2,335,907 | 12/1943 | Boor et al. | 188/319 |
| 2,481,088 | 9/1949 | Cuskie | 188/322 X |
| 2,487,472 | 11/1949 | Patriquin | 188/319 |
| 2,788,092 | 4/1957 | Whisler, Jr. | 188/322 X |
| 3,827,538 | 8/1974 | Morgan | 188/299 X |
| 4,114,735 | 9/1978 | Kato | 137/493 X |

FOREIGN PATENT DOCUMENTS 951693 10/1956 Fed. Rep. of Germany ...... 188/322

Primary Examiner—George E. A. Halvosa
Attorney, Agent, or Firm—Haseltine & Lake

[57] ABSTRACT

A shock absorber has expansion and compression damping characteristics readily adjustable, if required, to different extents. In one preferred form, it includes an adjustable orifice associated with a piston, and the orifice includes an annular flexible valve element and a valve-seat member engageable with the inner peripheral edge thereof. The valve-seat member is formed at the bottom with feet which are arranged opposite to a stepped or continuously inclined annular top surface portion of the piston and is axially movable for engagement with the latter. The amount of axial movement of the valve-seat member and hence that of deflection of the valve element is adjustable by rotation of the valve-seat member relative to the piston through provision therefor at the top of the cylinder. In an alternative form, the shock absorber has an expansion and a compression damping mechanism separately incorporated therein, including an externally adjustable valve mechanism arranged in the bottom of the cylinder in addition to the one associated with the piston. In this instance, the cylinder is received in a tubular casing for rotation relative thereto.

7 Claims, 27 Drawing Figures

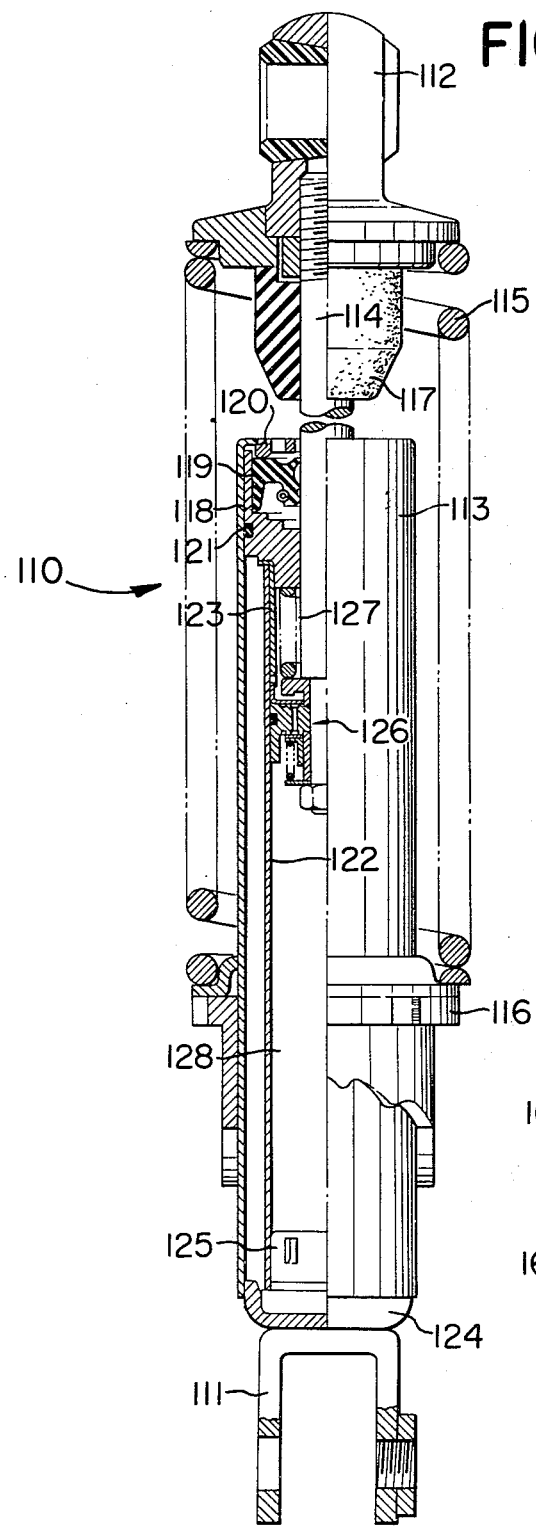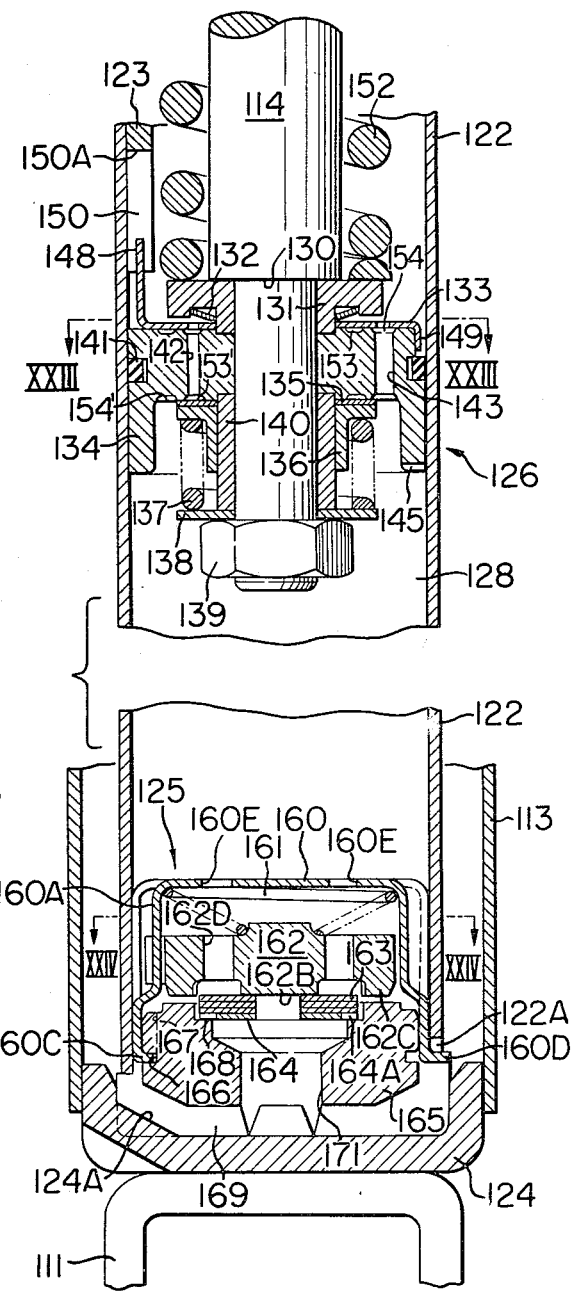
FIG. 21
FIG. 22

SHOCK ABSORBER FOR VEHICLE USE

This is a continuation of application Ser. No. 877,851 filed Feb. 15. 1978, now abandoned.

BACKGROUND OF THE INVENTION

This invention relates to shock absorbers for vehicle use of the type including a combination of a hydraulic cylinder and a piston slidably fitted therein and having freely adjustable damping characteristics for expansion and compression stroke movements of the assembly.

In general, it is desirable that a shock absorber usable in the suspension system of a vehicle has damping characteristics that can be adjusted as desired according to various service conditions such as the driver's taste in ride, the load condition of the vehicle and the road surface conditions. This requirement is particularly strong for small-sized vehicles of limited springing weight such as motorcycles but in practice it has previously been difficult to make adjustable the damping characteristics of a shock absorber as this tends to cause substantial increase in structural complexity and manufacturing cost.

In this connection, it is generally desirable to increase the magnitude of the damping force of a shock absorber when compressed in order to prevent the shock absorber from being fully compressed as when the vehicle travels over irregular ground surfaces but, for travelling over paved roads, the damping force during compression of a shock absorber should rather be limited as any excessively large damping force during compression impairs the riding comfort. Therefore, it is desired that the damping force of a shock absorber when compressed be freely variable in accordance with the ground or road conditions, that is, according to whether the vehicle travels over irregular surfaces or paved roads.

Also, unless the compression damping force and the expansion damping force of a shock absorber are properly adjusted relative to each other, an undesirable phenomenon is likely to occur in which the body of the vehicle gradually goes down or floats up, particularly when the vehicle travels over a rough road at relatively high speeds. Further, the effect upon the rider's feeling of the adjustment of the compression damping force is larger than that of the adjustment of the expansion damping force made at the same rate. Accordingly, it is desirable for a shock absorber to be arranged and constructed so that both the expansion and compression damping forces of the shock absorber are adjustable and that the range of adjustment of the compression damping characteristic and that of the expansion damping characteristic are made different from each other as required.

In addition, in view of the fact that such adjustment of the damping characteristics is to be effected frequently in accordance with the load, road and other driving conditions, the shock absorber should be of such a design as to require only a minimum of time or labor for adjustment of the damping characteristics.

Moreover, since in the suspension system any increase in unsprung weight should be avoided as far as possible, it is desirable to minimize any weight increase of a shock absorber as may be required to make variable its damping characteristics.

SUMMARY OF THE INVENTION

In view of the above, the present invention has for its object the provision of a novel shock absorber for vehicle use of the type described in which both the compression and expansion damping forces are readily adjustable and which is simple in structure and suitable for practical applications, involving no substantial increase in weight and manufacturing cost.

The above and other objects, features and advantages of the present invention will become apparent from the following description of a few preferred embodiments of the invention when taken in conjunction with the accompanying drawings.

BRIEF DESCRIPTION OF THE DRAWINGS

In the drawings:

FIG. 21 is a side view, partly in cross section, showing the whole structure of another form of shock absorber embodying the present invention;

FIG. 22 is an enlarged fragmentary cross-sectional view showing in upper half the piston valve assembly and in lower half the bottom valve assembly of the shock absorber shown in FIG. 21;

DESCRIPTION OF THE PREFERRED EMBODIMENTS

Figure 1:
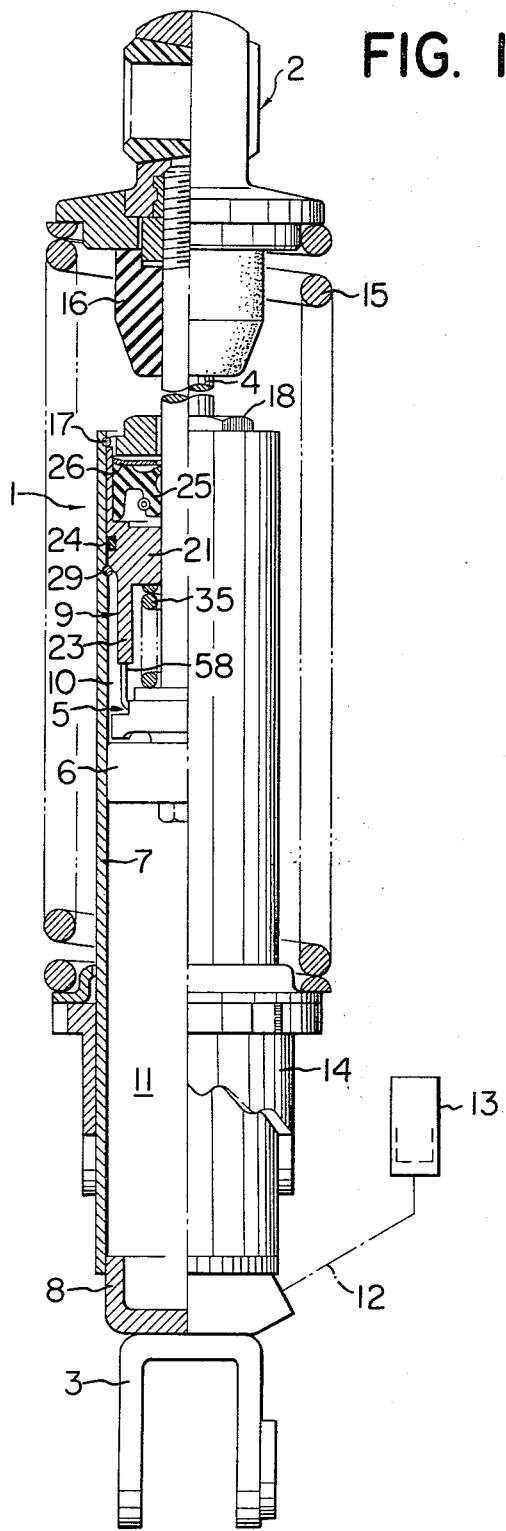
FIG. 1 is a side view, partly in cross section, of the whole structure of a shock absorber for vehicle use embodying the present invention.

Referring to the drawings and first to FIG. 1, there is illustrated a preferred form of shock absorber embodying the present invention, as generally indicated by reference numeral 1. The shock absorber 1 includes an upper mounting member 2 adapted to be secured to a vehicle frame portion of the suspension system and a lower mounting portion 3 adapted to be secured to the associated wheel assembly. The upper mounting member 2 is threadably fitted over the upper extreme end portion of a piston rod 4 and integrally secured thereto. A piston 6 and a valve mechanism 5 provided thereon are carried on the lower end portion of the piston rod 4. Secured as by welding to the lower mounting member 3 is a sealing cap 8 which hermetically seals a cylinder 7 at its bottom.

The piston 6, being slidably fitted in the cylinder 7, divides the interior space thereof into oil chambers 10 and 11, which are in fluid communication with each other through oil passages formed in the piston 6, as will be described later in detail. The flow of oil through the oil passages is controlled by the valve mechanism 5 and the operating characteristic of the latter is adjustable by means of an adjusting mechanism 9.

The lower oil chamber 11 is in communication with an accumulator 13 through an oil line connected to the sealing cap 8. The accumulator 13 is connected to a source of oil supply, not shown, and serves the purpose of maintaining the cylinder 7 in a state at all times filled with an appropriate amount of hydraulic oil.

A spring-force adjuster means 14 is fixedly secured around the outer peripheral surface of cylinder 7 by well-known means in a manner such as to be held against axial movement relative thereto during use of the shock absorber 1. The spring-force adjuster 14 and the upper mounting member 2 are both formed with a flange portion and a coiled suspension spring 15 is arranged between the flange portions in encircling relation to the cylinder 7 and piston rod 4. A cushion block 16 is fitted around the periphery of the piston rod 4 at a location close to its junction with the upper mounting member 2 to prevent direct abutting engagement of the top of cylinder 7 with the mounting member 2 as when the shock absorber 1 is fully compressed.

Figure 2:
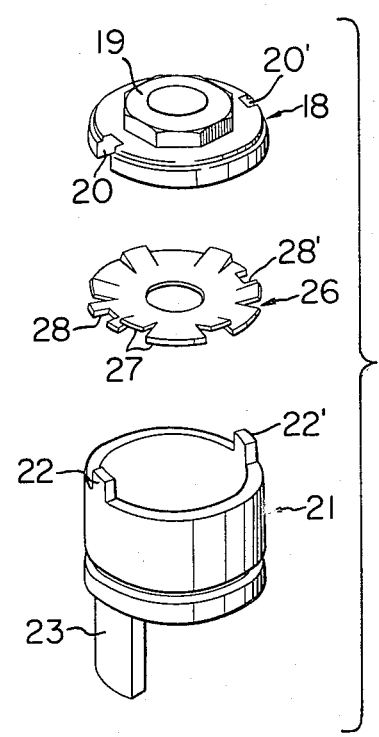
FIG. 2 is an exploded perspective view of an essential part of the shock absorber shown in FIG. 1.

Referring to FIGS. 1 and 2, an adjusting nut 18 is fitted in the cylinder 7 at the top end thereof, with use of a snap ring 17. The adjusting nut 18 is formed with a through hole centrally thereof to freely receive the piston rod 4 and also formed on the top side with a hexagonal head 19 to be readily engageable with an appropriate tool. Further, the adjusting nut 18 is formed in its outer peripheral edge portion with a pair of radially extending slots 20 and 20' in positions diametrically opposite to each other.

Arranged on the inside of the adjusting nut 18 is a spring washer 26 having a central aperture through which the piston rod 4 freely extends. The spring washer 26 has an outer diameter substantially the same as that of the adjusting nut 18 and is formed around the outer periphery thereof with a large number of springy fins 27 which are flexed alternately in opposite directions, as shown. Reference numerals 28, 28' indicate a pair of diametrally opposite notches formed in the outer periphery of the spring washer 26.

Fitted in the cyliner 7 on the inside of the spring washer 26 is a rod guide 21 which is held in liquid-sealing contact with the inner peripheral wall surface of cylinder 7 by way of an O-ring 24 and has a central bore through which the piston rod 4 is guided in its sliding movement. The rod guide 21 is held against axial movement relative to the cylinder 7 by means of a snap ring 29. The rod guide 21 has an upper tubular portion which defines therein an annular space in cooperation with the piston rod 4. A pair of lugs 22 and 22' are formed on the tubular portion in positions diametrically opposite to each other, extending upwardly from the top edge thereof. The lugs 22 and 22' are held engaged in respective notches 28, 28' formed in the spring washer 26 and in respective slots 20, 20' formed in the adjusting nut 18 so that the spring washer 26 and rod guide 21 are rotatable simultaneously around the piston rod 4 when the adjusting nut 18 is driven to rotate around the piston rod 4 by appropriate tool means. The spring washer 26 with its fin formation serves to urge the adjusting nut 18 and the rod guide 21 in directions opposite to each other thereby to prevent any play of the adjusting nut 18 and rod guide 21 relative to respective snap rings 17 and 29.

A sealing element 25 is fitted in the annular space in the upper tubular portion of rod guide 21 for sealing engagement with the piston rod 4 so that any axial leakage of hydraulic oil from the upper oil chamber 10 otherwise occurring along the peripheral surface of piston rod 4 is effectively prevented. Also, the rod guide 21 is formed on its bottom end face at a location adjacent to the outer peripheral edge thereof with a downwardly projecting driver arm 23 which is held in engagement with engaging portions 58 of a torque-transmitting member of the valve mechanism 5, as will be described later.

Referring next to FIGS. 3 to 7, the piston rod 4 has a reduced-diameter bottom end portion 30 on which the valve mechanism 5 and piston 6 are mounted. Specifically, a washer 31 is fitted to the reduced-diameter portion 30 at the upper, base end thereof and the piston 6 is fitted thereto directly adjacent to the washer 31. The piston 6 has a tubular portion 36 extending upwardly into abutting engagement with the washer 31. Further, on the underside of piston 6, the reduced-diameter portion 30 of piston rod 4 is fitted with a washer 33 and a nut 34. The nut 34 is threaded on the reduced-diameter portion 30 tightly against the washer 33 and piston 6 and held in place by appropriate lock means. A cushion spring 35 is arranged between the washer 31 and the bottom end face of rod guide 21 to serve the purpose of alleviating the shock arising upon expansion of the shock absorber 1.

Figure 3:
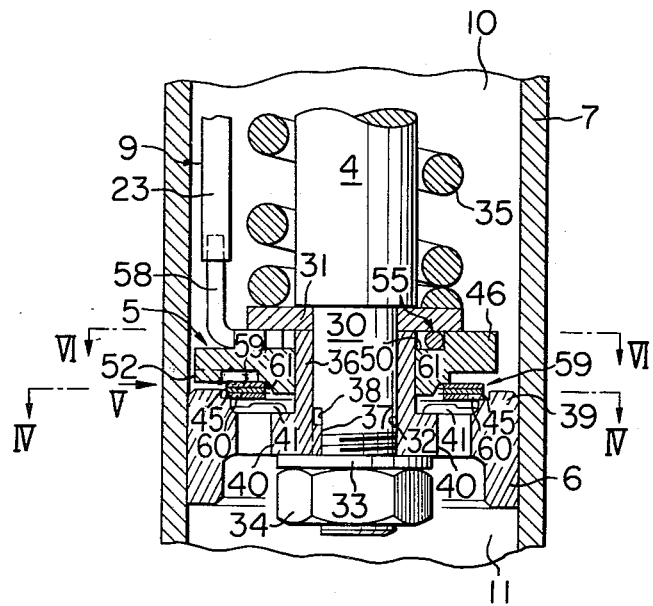
FIG. 3 is a fragmentary longitudinal cross-sectional view of another essential part of the shock absorber shown in FIG. 1, taken along the line III—III in FIG. 6.
Figure 4:
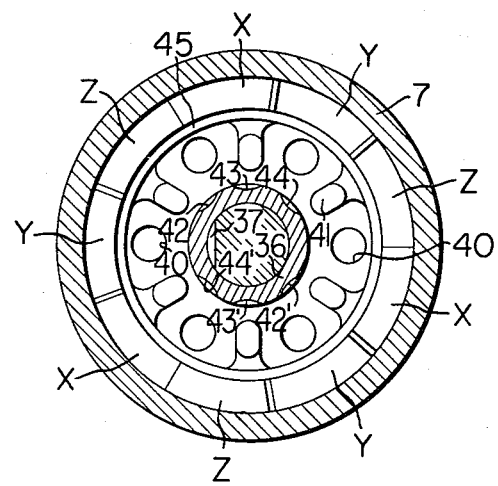
FIG. 4 is a transverse cross-sectional view taken along the line IV—IV in FIG. 3.

Referring particularly to FIGS. 3 and 4, the piston 6 is formed on the inner wall surface of its central bore with a chordal flat rib 37 at a location adjacent to the bottom end face of the piston and the flat surface of the rib 37 is held in close contact with a flat face 38 of the reduced-diameter piston-rod portion 30 so that the piston 6 is restrained against any rotation relative to the piston rod 4.

Figure 5:
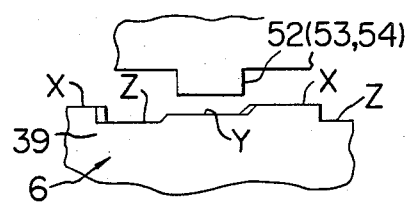
FIG. 5 is a fragmentary side view of that portion of FIG. 3 which is indicated by the arrow V.

Formed on the top side of piston 6 around the outer periphery thereof is an annular ridge 39 which defines at its top three sets of controlling flat surfaces, each including three such surfaces X, Y and Z arranged at regular intervals within a 120° range and raised to successively higher levels, as seen in FIGS. 4 and 5.

Inside of the annular ridge 39, the piston 6 is formed on its top side with an annular valve seat 45 and a plurality of oil passage bores 40 are formed vertically through the piston at equicircumferential distances, opening at one end in the annular top surface defined between the valve seat 45 and the base of tubular portion 36 of the piston 6. Limiting projections 41 are formed on the annular top surface of the piston, each in a position between two adjacent oil passage bores 40, to serve the purpose of limiting the amount of deflection of a valve element 59, which will be described later in detail.

Figure 6:
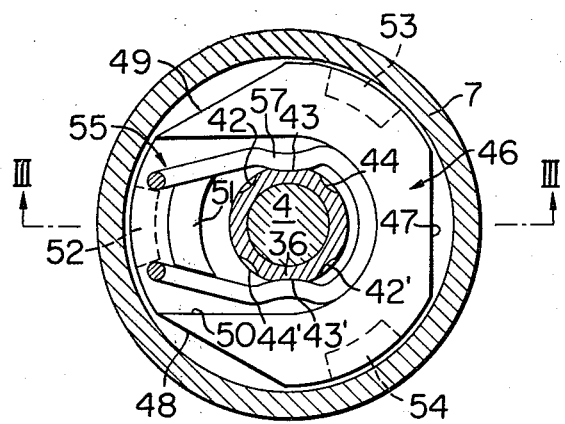
FIG. 6 is a transverse cross-sectional view taken along the line VI—VI in FIG. 3.
Figure 8:
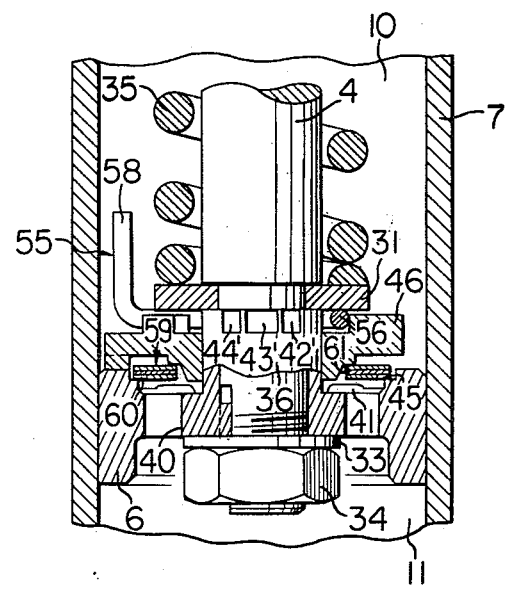
FIGS. 8 to 10 are views similar to FIG. 3, showing the shock absorber of FIG. 1 in different stages of operation.
Figure 9:
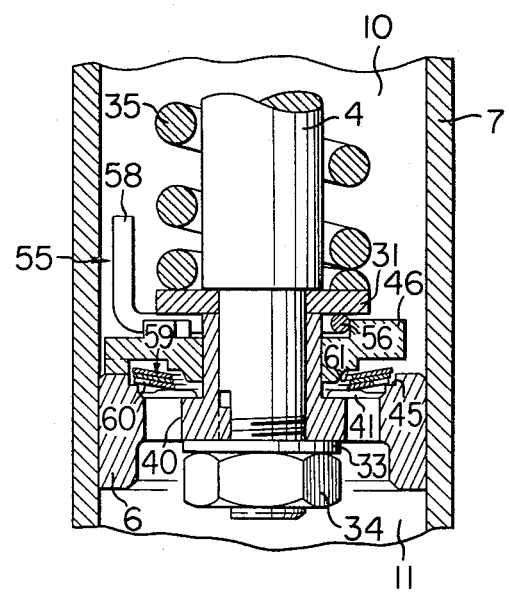

Referring now to FIGS. 4, 6 and 8, the tubular portion 36 of piston 6 is formed at the top in the outer peripheral surface thereof with three pairs of diametrally opposite recesses 42, 42'; 43, 43'; 44, 44'. An annular valve-seat member 46 is fitted over the tubular portion 36 for rotation and axial sliding movement relative thereto.

Referring to FIGS. 3 and 6, the valve-seat member 46 is chamfered to form three equi-circumferentially spaced flats 47, 48 and 49 on the outer periphery thereof. Formed in the top side of the valve-seat member 46 is a cavity 50 which extends radially from the central region of the member 46 to the periphery thereof and has a fixed substantial width. An arcuate projection 51 is formed on the bottom of the cavity 50 and an adjusting-torque transmitting wire spring member 55 is fitted in the cavity 50 which is shaped to resiliently embrace the arcuate projection 51 and the tubular portion 36 of piston 6, as shown in FIG. 6.

Figure 7:
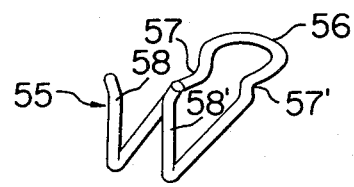
FIG. 7 is a perspective view of the torque-transmitting spring of the shock absorber shown in FIG. 1.

As clearly shown in FIG. 7, the torque-transmitting wire spring 55 is generally of bifurcated form, including a looped portion 56, a pair of opposite flexed portions 57 and 57' bent convexly toward each other, and a pair of parallel upstanding portions 58 and 58'. Obviously, when forced away from each other, the two legs of the wire spring 55, each including flexed and upstanding portions 57–58 or 57'–58', will be urged inwardly toward each other under the resiliency of the wire spring per se. As mounted in the cavity 50, the torque-transmitting spring 55 has its flexed portions 57, 57' resiliently fitted in one pair of recesses 42, 42'; 43, 43'; or 44, 44', formed in the tubular portion 36 of piston 6 in positions diametrally opposite to each other. At the same time, those leg portions extending between the flexed (57, 57') and upstanding (58, 58') portions are resiliently held on the arcuate projection 51 at the opposite ends thereof. Similarly, the upstanding portions 58, 58' are resiliently held against the tip portion of driver arm 23 on the opposite sides thereof. With this arrangement, when the driver arm 25 is driven to rotate around the piston rod 4, the torque is transmitted through the adjusting-torque transmitting spring 55 to the valve-seat member 46, causing the latter 46 to rotate relatively to the piston 6 around the tubular portion 36 thereof.

Formed on the underside of valve-seat member 46 are three downwardly extending feet 52, 53 and 54 which are arranged at equal intervals along a circle of the same radius as the annular ridge on the piston 6 so as to be placed vertically opposite, respectively, to three controlling flat surfaces X, Y or Z of the same height, one in each of the three sets of such surfaces formed on the piston. Specifically, these feet 52, 53 and 54 are placed opposite to the respective controlling flat sufaces X when the flexed portions 57, 57' of torque-transmitting spring 55 snap into paired recesses 42, 42' in the tubular piston portion 36, and placed opposite to respective controlling flats Y when the flexed spring portions 57, 57' snap into recesses 43, 43' and opposite to controlling flats Z when the flexed spring portions 57, 57' snap into recesses 44, 44'.

An annular valve seat 61 is also formed on the underside of the valve-seat member 46 radially inside of feets 52, 53 and 54 and an annular valve element 59 formed of resilient sheet material is arranged under the valve-seat member 46. The top and bottom faces of the valve element 59 are resiliently held in pressure contact with the valve seat 61 of valve-seat member 46 and the one 45 of piston 6, respectively, around the inner and outer peripheries of the valve element. In this manner, the valve-seat member 46 is normally biased in a direction away from the piston 6 under the action of valve element 59 with the feet 52, 53 and 54 held spaced from the respective controlling flat surfaces of the piston 6.

The valve element 59 is made of a plurality of annular resilient sheets overlying each other and one of the resilient sheets which is closest to the piston 6 is formed with a plurality of radially extending notches around the outer periphery thereof. These notches define orifices 60 in cooperation with the valve seat on the piston 6.

In the shock absorber 1 constructed as described above, the oil pressure in the upper oil chamber 10 is raised, when the shock absorber is forced to expand, to exceed that in the lower oil chamber 11 so that the valve-seat member 46 and the valve element 59 are pushed toward the piston 6, as shown in FIG. 8. On this occasion, the inner peripheral region of valve element 59 is deflected downwardly toward the piston 6 while the valve seat 61 of the valve-seat member 46 is held in contact with the valve element 59 so that there arises a flow of hydraulic oil from the upper oil chamber 10 into the lower one 11 through orifices 60 and oil passages 40. The damping characteristic of the shock absorber in this instance is illustrated by a curve a in FIG. 11, in which the abscissa represents the piston speed and the ordinate in the upper region represents the expansion damping force, that in the lower region representing the compression damping force.

As the expanding force acting on the shock absorber 1 is increased, the valve-seat member 46 is further displaced toward the piston 6 until the feet 52, 53 and 54 come into abutting engagement with the respective controlling flats X, Y or Z of piston 6. Subsequently, as the expanding force on the shock absorber 1 is further increased to raise the speed of piston 6 relative to the cylinder 7, the valve element 59 is moved apart from the valve seat 61 of valve-seat member 46, allowing an additional flow of hydraulic oil from the upper oil chamber 10 into the lower one 11 through the annular clearance now defined between the valve element 59 and valve seat 61. The damping characteristic of the shock absorber 1 at this instance is shown by a solid line $b_2$ in FIG. 11.

The clearance between the valve element 59 and valve seat 61 is increased with rise of the piston speed but, once the inner peripheral edge portion of the valve element 59 is placed in abutting engagement with the limiting projections 41 formed on the top of piston 6, such clearance cannot be increased any further and the damping characteristic subsequently follows a quadratic curve, as indicated by the right-hand end portion of solid line $b_2$ in FIG. 11.

Figure 11:
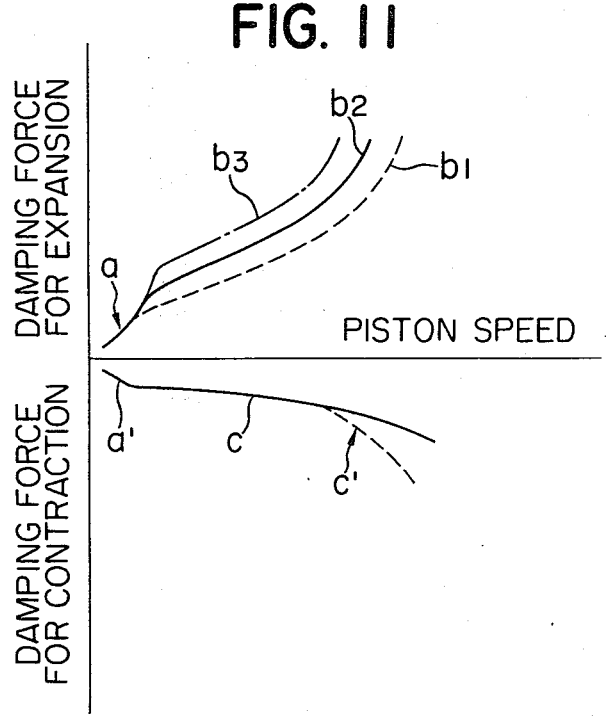
FIG. 11 is a damping characteristic curve diagram of the shock absorber shown in FIG. 1.

In the diagram of FIG. 11, the position of the point at which curve a is joined with solid line $b_2$ depends upon the distance of travel allowed for the valve-seat member 46 relative to the piston 6 and which distance in turn depends upon the spacing between the feet 52, 53 and 54, on the one hand, and the respective controlling flat surfaces X, Y or Z of piston 6, on the other hand. Now assuming that the adjusting nut 18 is turned by appropriate tool means, the turning torque is transmitted to the valve-seat member 46 through rod guide 21 and adjusting-torque transmitting spring 55, which is held in engagement with the driver arm 58 of rod guide 21 so that the valve-seat member 46 is rotated stepwise relative to the piston 6 by way of selective engagement of the flexed portions 57 and 57' of adjusting-torque transmitting spring 55 with the recesses 42, 42'; 43, 43'; 44, 44'. Simultaneously with this, the feet 52, 53 and 54 of valve-seat member 46 are selectively placed in positions opposite to the respective controlling flats X, Y or Z of the piston 6 and in this manner the allowable distance of travel of the valve-seat member 46 relative to the piston 6 is set in a stepwise fashion. In this embodiment, in which the height of controlling flat surfaces X is the largest and that of controlling flat surfaces Z is the smallest, the damping characteristic curve of the shock absorber 1 is represented by the broken line $b_1$ in FIG. 11 when the feet 52, 53 and 54 are in positions opposite to the respective controlling flats X; by the solid line $b_2$ when feet 52, 53 and 54 are opposite to controlling flats Y; and by the chain-dotted line $b_3$ when feet 52, 53 and 54 are opposite to controlling flats Z.

Now suppose that the shock absorber 1 is subjected to a compressive force so that the oil pressure in the lower oil chamber 11 becomes higher than that in the upper oil chamber 10. This time, there arises a flow of hyraulic oil from the lower oil chamber 11 into the upper one 10 through oil passages 40 and orifices 60 and the damping characteristic at this instance, is represented by the curve a' in FIG. 11.

Figure 10:
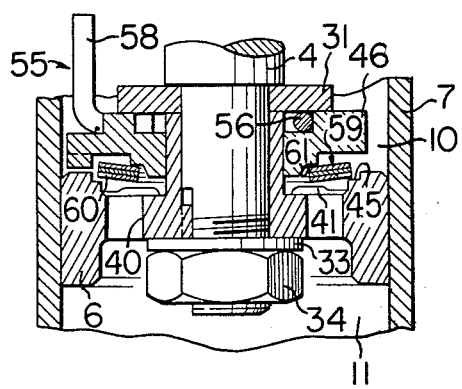

Subsequently, when the compressive force acting on the shock absorber 1 is increased and the speed of piston 6 is raised accordingly, the valve element 59 is deflected in the manner illustrated in FIG. 10 to form an annular clearance between the valve element 59 and valve-seat member 46. The damping characteristic at this instance is represented by the line c in FIG. 11. In this connection, where the valve-seat member 46 is provided with appropriate controlling projections (not shown) or the like means for limiting the amount of deflection of the valve element 59, the damping characteristic curve will be quadratic in the higher range of piston speed, as indicated at c' in FIG. 11.

Another preferred embodiment of the present invention is illustrated in FIGS. 12 to 15, in which the same references have been retained, with primes affixed as required, for similar parts which have the same functions as in FIGS. 1 to 10.

In this embodiment, there is provided in place of the tubular portion 36 of the piston 6 in the previous embodiment a separate tubular member 36' which is fitted over the reduced-diameter bottom end portion 30 of piston rod 4 and held against rotation relative thereto by a flat rib 37' formed on the inner wall surface of the member 36' so as to be held in contacting engagement with the flat side 38 of the reduced-diameter portion 30 of piston rod 4. Reference numeral 6' indicates a piston fitted over the tubular member 36'.

The piston 6' has formed on its top with an annular ridge 39' on top of which controlling flat surfaces quite similar to those X, Y and Z shown in FIGS. 4 and 5 are formed. The piston 6' is formed on its top radially inside of the annular ridge 39' with an annular valve seat 45' which is normally held in spring contact with the outer peripheral portion of the bottom face of an annular valve element 59' formed of resilient sheet material. Further, inside of the annular valve seat 45', the piston 6' is formed with a plurality of circumferentially spaced oil passage bores 40' which extend axially through the annular thin-walled section thereof. Limiting projections 41' are formed on the top of piston 6' between the oil passage bores 40' to serve the purpose of limiting the amount of deflection of the valve element 59'. Interposed between the tubular member 36' and nut 34 is an anti-turn washer 69 which is formed on its inner periphery with a chordal rib 70 for engagement with the side flat 38 on the reduced-diameter portion 30 of piston rod 4. On the outer periphery of the washer 69 is formed a pawl or upturned lug 71 which is fitted in an engaging slot 72 formed in the wall of one of the oil passage bores 40' in piston 6'. In this manner, the piston 6' is held together with the tubular member 36' against rotation around the piston rod 4 but is axially movable relative to the tubular member 36'.

Figure 13:
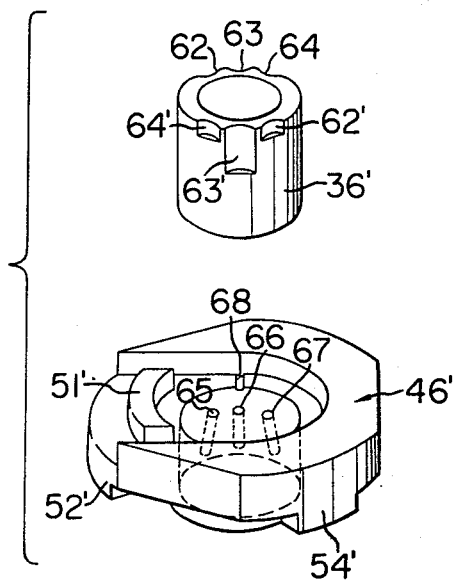
FIG. 13 is a perspective view of the valve-seat member and associated tubular member shown in FIG. 12.

Referring to FIG. 13, three pairs of diametrally opposite recesses 62, 62'; 63, 63'; 64, 64' are formed in the outer peripheral surface of tubular member 36' at the top edge thereof. Recesses 62, 62'; 64, 64' are formed in an axial length just enough to receive the flexed portions of adjusting-torque transmitting spring 55 while the remaining recesses 63, 63' each have an axial length much larger than that of recesses 62, 62'; 64, 64'.

Fitted over the tubular member 36' is a valve-seat member 46' which is formed on its underside with an annular valve seat 61' which is normally held in spring contact with the top face of valve element 59' along the inner periphery thereof. The valve-seat member 46' is formed therein with a cavity 50 like the one in the valve-seat member 46 shown in FIG. 6 and is formed on the bottom of the cavity 50 with an arcuate projection 51' which is clamped by the adjusting-torque transmitting spring 55. The bottom of cavity 50 is recessed to ensure passage of hydraulic oil in spite of the arrangement of the adjusting-torque transmitting spring 55 therein, as indicated at 68 in FIG. 13. Further, the valve-seat member 46' is provided on its underside in the outer peripheral region thereof which is vertically opposite to the annular ridge 39' on the piston 6', with a set of three circumferentially spaced feet 52', 53', and 54' which serve the same function as feet 52, 53 and 54 on the valve-seat member 46 shown in FIG. 6. The valve-seat member 46' is formed therein with three pairs of diametrically opposite through apertures 65, 66 and 67 of limited diameter. These apertures, extending aslant to the axis of the valve-seat member 46', each open at one end in the bottom end face thereof inside of the valve seat 61' and at the other end in the upper portion of the inner wall surface of the axial bore, formed in the valve-seat member 46' to receive the tubular member 36'. For simplicity's sake, one of the through apertures 65, 66 or 67 in each pair which is arranged diametrically opposite to the other one shown is omitted in FIG. 13. It is to be noted that the paired through apertures 65, 66 and 67 have different diameters varying in the order named and, as the valve-seat member 46' is rotated around the piston rod 4 by means of the adjusting mechanism 9, are selectively placed in fluid communication with the recesses 63, 63' in the tubular member 36' thereby to intercommunicate the upper and lower oil chambers 10 and 11. It will thus be noted that, in this embodiment, the through apertures 65, 66 and 67 serve as orifice means in the present invention providing for stepwise control of the rate of oil passage between the oil chambers by selective communication with recesses 63 and 63'.

Figure 12:
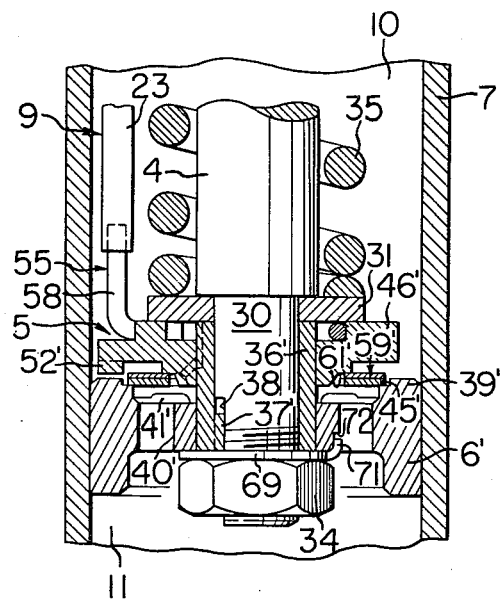
FIG. 12 is a view similar to FIG. 3 of another form of shock absorber for vehicle use embodying the present invention.
Figure 14:
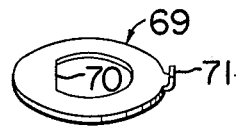
FIG. 14 is a perspective view of the anti-turn washer used in the shock absorber of FIG. 12.
Figure 15:
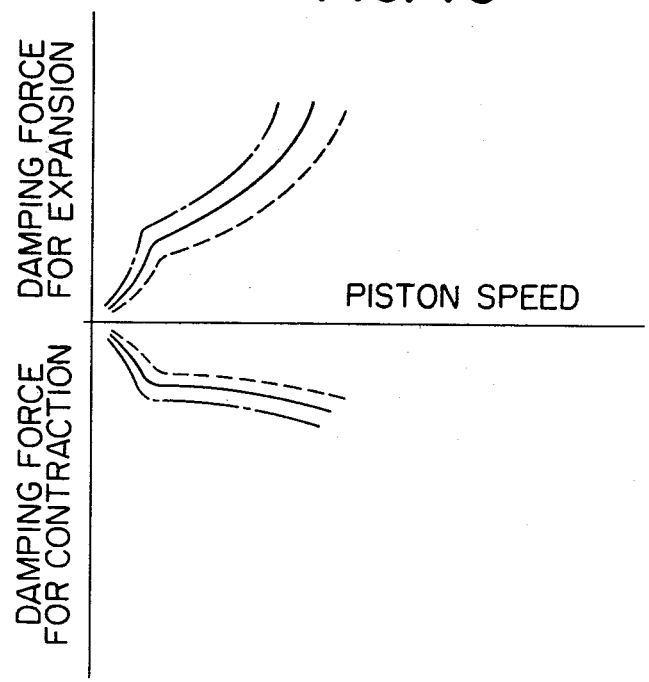
FIG. 15 is a damping characteristic curve diagram of the shock absorber of FIG. 12.

In FIG. 15 are illustrated the damping characteristic curves of the shock absorber 1 shown in FIGS. 12 to 14. In FIG. 15, the chain-dotted line represents the damping characteristic obtainable when one of the pairs of through apertures 65, 66 and 67 having the least diameter are in fluid communication with the recesses 63 and 63'; the broken line represents the damping characteristic obtainable when the paired through apertures of the largest diameter are in fluid communication with the recesses 63 and 63'; and the solid line represents the damping characteristic obtainable when the paired through apertures of the medium diameter are in communication with the recesses 63, 63'. It is to be recognized, therefore, that in this embodiment of FIGS. 12 to 15 the damping characteristic of the shock absorber can be adjusted more finely than with the case of the previous embodiment because of the orifice means in effect adjustable in diameter.

Another preferred embodiment of the present invention is illustrated in FIGS. 16 to 20, in which the same references have been retained for similar parts which have the same functions as in the previous embodiment shown in FIGS. 1 to 10.

Figure 16:
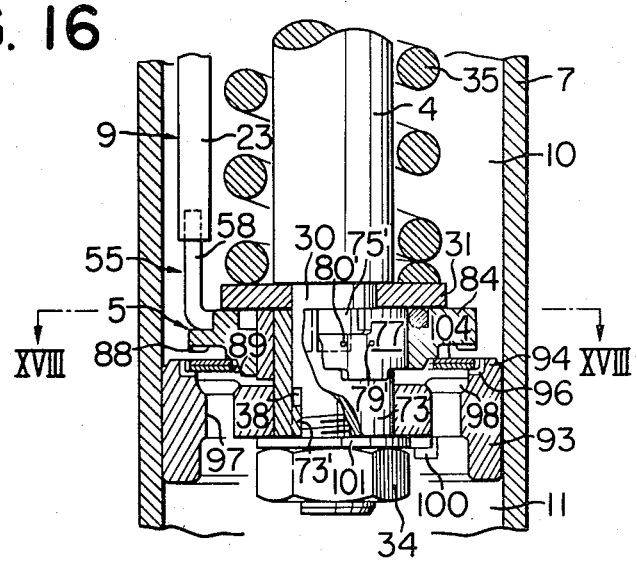
FIG. 16 is a view similar to FIGS. 3 and 12, showing a further form of shock absorber embodying the present invention.
Figure 17:
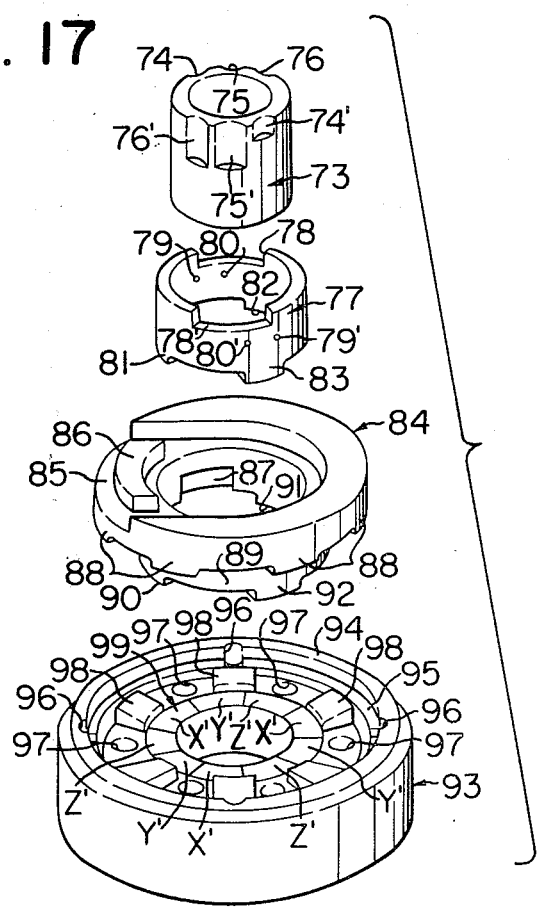
FIG. 17 is an exploded perspective view of the piston and valve assembly shown in FIG. 16.
Figure 18:
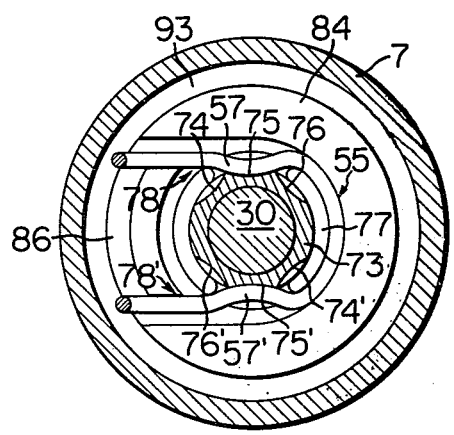
FIG. 18 is a transverse cross-sectional view taken along the line XVIII—XVIII in FIG. 16.

Referring first to FIGS. 16 and 17, a tubular member 73 is fitted over the reduced-diameter bottom end portion 30 of piston rod 4 an is formed on the wall of the axial bore with a flat rib 73' which is held in engagement with the side flat 38 on the reduced-diameter end portion 30. Again, three pairs of recesses 74, 74'; 75, 75'; 76, 76' are formed in the outer peripheral surface of the tubular member 73 at the top thereof, such recesses in each pair being positioned diametrally opposite to each other. Recesses 74, 74 in one of the three pairs of recesses are formed in an axial length sufficient to receive the paired flexed portions 57 and 57' of an adjusting-torque transmitting spring 55 shown in FIG. 18 while the other paired recesses 75, 75'; 76, 76' have an axial length substantially larger than that of recesses 74, 74', as clearly seen in FIG. 17.

A piston 93 is fitted over the tubular member 73 adjacent to the bottom thereof and is formed on the top along the outer peripheral edge thereof with an annular ridge 94 and an annular valve seat 95 which extends inside the annular ridge 94 for contacting engagement with the outer peripheral edge portion of the bottom face of an annular valve element 104, which is formed of resilient sheet material. The valve seat 95 is formed therein with a plurality of circumferentially spaced radially recessed grooves 96, which in cooperation with the valve element 104 share the function of orifice means in the present invention when the valve element 104 is in contact with the valve seat 95, formed on the piston 93.

The piston 93 has a plurality of oil passage bores 97 arranged radially inside of the valve seat 95 at appropriate circumferential spacings and extending through the piston axially thereof. Limiting projections 98 are formed on the top face of piston 93 each between two adjacent oil passage bores 97 to serve the purpose of limiting the amount of deflection of the valve element 104. Radially further inside of the oil passage bores 97 are formed three sets of controlling flat surfaces X', Y' and Z' which serve the same function as those X, Y and Z formed on piston 6 shown in FIG. 4.

Figure 19:
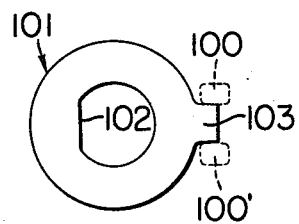
FIG. 19 is a plan view of the anti-turn washer shown in FIG. 16.

Fitted over the reduced-diameter portion 30 of piston rod 4 between the tubular member 73 and nut 34 is an anti-turn washer 101 which is formed on the inner periphery thereof with a chordal rib 102 for engagement with the side flat 38 on the reduced-diameter portion 30 of piston rod 4, as seen in FIG. 19. A lug 103 is also formed on the washer 101 which extends radially outwardly from the outer periphery of the washer so as to be held engaged between a pair of lugs 100 and 100', which extend downwardly from the underside of the piston 93. With this arrangement, it will be noted that the piston 93 is restrained together with the tubular member 73 against rotation relative to the piston rod 4 but is axially movable relative to the tubular member 73.

An annular controlling tripod or element 77 is fitted over the tubular member 73 in a position adjacent to the top thereof for rotation and axial sliding movement relative to the tubular member 73. A pair of notches 78 and 78' are formed in the annular control element 77 at the top thereof in positions diametrally opposite to each other. Also, two pairs of radially extending diametrally opposite small apetures 79, 79'; 80, 80' are formed in the wall of the control element 77 in positions adjacent to and below the notches 78, 78'. It is to be noted that the distance between each two adjacent small apertures 79–80 and 79'–80' is equal to the center distance between each two adjacent recesses 75–76 and 75'–76' formed in the tubular member 73. Provided on the annular control element 77 are three equally spaced feet 81, 82 and 82 which extend downwardly from the bottom end of the element 77 and are faced opposite to that region of the top face of piston 93 which lies radially inside of the controlling surfaces or flats X', Y' and Z'.

A valve-seat member 84 is fitted over the outer periphery of annular control element or tripod 77 for free sliding movement relative thereto. The valve-seat member 84 has formed therein a cavity 85 similar to the one 50 formed in the valve-seat member 46 shown in FIG. 6. Provided in the bottom of cavity 85 is an arcuate projection 86 which is clamped between the legs of an adjusting-torque transmitting spring 55, which is mounted in cavity 85. The flexed portions 57, 57' of the spring 55 as mounted extend radially inwardly through the respective notches 78 and 78', formed in annular control element 77, and are snappingly engageable with any one of the three pairs of recesses 74, 74'; 75, 75'; 76, 76' formed in the tubular member 73 upon stepwise rotational operation of the adjusting mechanism 9. Also, a pair of recesses 87, only one of which is shown in FIG. 17 for simplicity's sake, are formed in the inner peripheral surface of the valve-seat member 84 and adjacent to the bottom thereof in positions diametrally opposite to each other. In the state of the valve-seat member 84 assembled with the annular control element 77, the top portions of recesses 87 are held in fluid communication with the respective sets of closely spaced small apertures 79–80 and 79–'80' formed in the annular control element 77 while the recesses 87 are held donwardly open at the bottom of valve-seat member 84.

Formed on the underside of valve-seat member 84 are an annular valve seat 89 which engages the top face of valve element 104 around the inner periphery thereof and a plurality of limiting projections 88 which are arranged radially outside of the valve seat 89 at appropriate circumferential spacings to serve the purpose of limiting the amount of deflection of the valve element 104. Also, formed on the underside of the valve-seat member 84 in positions radially inside of the valve seat 89 are three downwardly projecting feet 90, 91 and 92 which are circumferentially equally spaced from each other, facing downwardly toward that annuar region of the top of piston 93 which lies directly outside of the controlling surfaces or flats X', Y' and Z' of piston 93. These feet 90, 91 and 92 are all equal in height of projection like those 81, 82 and 83 formed on the annular control element 77. In the state of the valve-seat member 84 assembled with the annular control element 77, the feet 90, 91 and 92 of the valve-seat member 84 are held in phase with the respective feet 81, 82 and 83 of annular control element 77 in overlying relation with the feet 81, 82 and 83. In this connection, it is to be noted that the length or height of projection of the feet 90, 91 and 92 of valve-seat member 84 is smaller than that of the feet 81, 82 and 83 of annular control element 77. Because of this, regardless of to which one of the three sets of flats X', Y' and Z' the feet 81–83 and 90–92 are placed opposite, the distance over which the valve-seat member 84 travels, upon expansion of the shock absorber 1, toward the piston 93, following the valve element 104 being deflected is at all times smaller than the distance over which the piston 93 travels, upon compression of the shock absorber 1, toward the valve-seat member 84, following the deflection of valve element 104. With such arrangement, it will be readily appreciated that the expansion and compression damping characteristics of the shock absorber 1 are effectively differentiated and thus the phenomenon of vehicle floating or sinking, which impairs the riding comfort, can be appropriately alleivated.

In this embodiment, when the valve-seat member 84 and annular control element 77 are turned around the tubular member 73 by operation of the adjusting mechanism 9, the two sets of small apertures 79–80 and 79', 80' in annular control element 77 are positioned stepwise so as to be both closed completely by the outer peripheral surface of tubular member 73 or to place either one or both of the two pairs of recesses 75, 75'; 76, 76', formed in the tubular member 73, selectively in fluid communication with the recesses 87 in the valve-seat member 84. In other words, with this arrangement, the upper oil chamber 10 can be placed in fluid communication with the lower oil chamber 11, as desired, through either one or both of the two pairs of recesses 75, 75'; 76, 76', either one or both of the two pairs of small apertures 79, 79'; 80, 80', and the paired recesses 87 and, in this manner, the two pairs of small apertures 79, 79'; 80, 80' in cooperation with the recessed grooves 96 formed in the valve seat of piston 93 function as orifice means in the present invention. In addition, the two pairs of small apertures 79, 79'; 80, 80' jointly operate as a variable orifice since either one or both of the pairs of such small apertures are selected, as desired, upon rotation of the valve-seat member 84 and annular control element 77 relative to the tubular member 73, as described above, and, simultaneously with this, the allowable distance of axial movement of the valve-seat member 84 and annular control element 77 relative to the piston 92 is adjusted stepwise. It will thus be readily recognized that the damping characteristics of the shock absorber 1 can be adjusted expediently in a fine manner.

Figure 20:
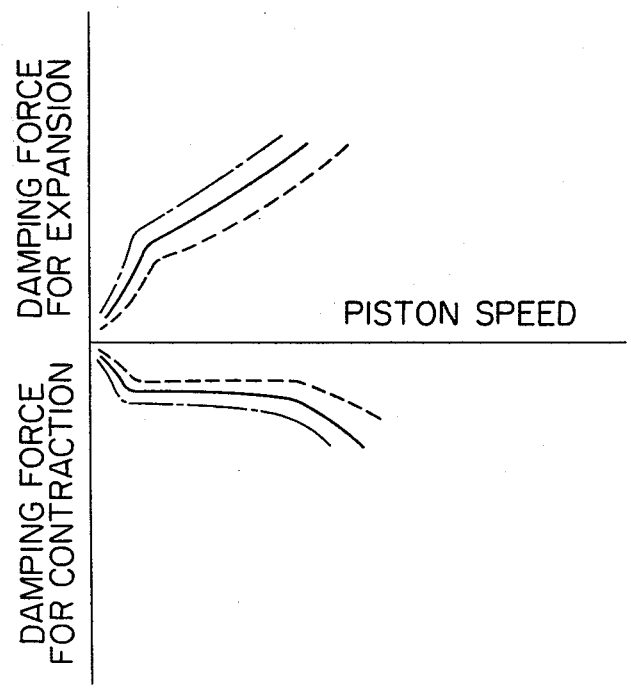
FIG. 20 is a damping characteristic curve diagram of the shock absorber shown in FIG. 16.

FIG. 20 illustrates the damping characteristic curves of the shock absorber 1 shown in FIGS. 16 to 19. In this figure, in chain-dotted lines represent the damping characteristics obtainable when the two pairs of small apertures 79, 79'; 80, 80' are completely closed by that portion of the outer peripheral surface of tubular member 73 which lies immediately below the recesses 74, 74' and the valve-seat member 84 and annular control element 77 are angularly positioned relative to the tubular member 73 so that the feet 90, 91 and 92 of valve-seat member 84 and those 81, 82 and 83 of annular control element 77 are held in positions opposite to the controlling surfaces or flats X' on the piston 93, which are the highest in level of all the sets of controlling surfaces formed on the piston 93; the solid lines represent the damping characteristics obtainable when only one of the two pair of small apertures 79, 79'; 80, 80' are in fluid communication with either one of the two pairs of recesses 75, 75'; 76, 76' in the annular control element 77 and the valve-seat member 84 and annular control element 77 are angularly positioned relative to the tubular member so that the feet 90–92 of valve-seat member 84 and those 81–83 of annular control element 77 are held in positions opposite to the controlling flats Y' of the piston 93, which are of the medium height, and the broken lines represent the damping characteristics obtainable when the two pairs of small apertures 79, 79'; 80, 80' are in communication with the respective pairs of recesses 75, 75'; 76, 76' and the valve-seat member 84 and annular control element 77 are angularly positioned relative to the tubular member 73 so that the feet 90–92 of valve-seat member 84 and those 81–83 of control element 77 are held in positions opposite to the controlling flats Z' of the piston 93, which are of the least height.

In each of the embodiments described hereinbefore, it will be readily understood that the piston 6, 6' or 93 and valve-seat member 46, 46' or 84 together consitute valve supporting means in the present invention and the piston 6, 6' or 93 also serves as a first annular valve-seat member for the valve element 59 or 104, the valve-seat member 46, 46' or 84 serving as a second valve-seat member therefor.

In any of the previous embodiments, the shock absorber for vehicle use is provided with an adjusting mechanism for conveniently adjusting the operating characteristics of the valve mechanism from outside and, owing to this, the damping characteristics of the shock absorber can be readily adjusted as desired by extremely simple operation in accordance with the driving conditions of the vehicle. Moreover, the shock absorber is provided with a valve-element supporting means operative to hold the valve element in its closed state unless the amount of deflection of the latter exceeds a preset value and to place the valve element in an open state when the amount of deflection thereof exceeds the preset value and is also provided with orifice means arranged between the upper and lower oil chambers to allow only a preset flow of oil therebetween when the valve element is in closed position and the valve element itself is so constructed and and arranged as to be resiliently deformed in a manner such that its opening extent varies in accordance with the oil pressure differential between the oil chambers on the opposite sides of the piston. The shock absorber, therefore, can exhibit damping characteristics at all times suited to the magnitude and quality of the shock load as applied to the shock absorber.

Furthermore, the damping characteristics of the shock absorber can be freely changed as required owing to the provision of control means making it possible to selectively limit the amount of displacement of the valve-element supporting means by operation of the adjusting mechanism.

A further preferred embodiment of the present invention is illustrated in FIGS. 21 to 25. Referring first to FIG. 21, reference numeral 110 generally indicates a damper which is mounted, on one hand, on the wheel side of the suspension system of a vehicle, for example, on the rear-wheel swing arm of a motorcycle as by bolt means by way of a lower york 111 and, on the other hand, on the frame of the vehicle as by bolt means by way of an upper bracket 112 and, including a tubular outer casing 113 formed integral with the york 111 and a piston rod 114 formed integral with the bracket 112 and slidably received in the tubular casing 113, the damper 110 develops as damping force against axial movement of the piston rod 114 relative to the tubular casing 113 as occurring when the assembly is compressed and expanded between the vehicle frame and the wheel. A coiled suspensing spring 115 is arranged in a conventional manner between the upper bracket 112 and the tubular casing 113, on which a spring adjuster 116 is securely mounted by any known means to support the suspension spring 115 at the bottom thereof and is operable to adjust the vehicle height according to the load condition of the vehicle. In order to absorb the shock occurring if the suspension assembly be compressed to a full extent as when the vehicle travels over rough roads, a rubber bumper 117 is mounted on the piston rod 114 adjacent to its top in concentric relation thereto.

Incorporated in the top end portion of tubular casing 113 is a rod guide 118 with an oil seal 119 fitted therein. Reference numeral 120 indicates a damper adjuster which is incorporated above the rod guide 118 and plays an additional role of holding the oil seal 119 in place. The rod guide 118 is formed around the outer periphery thereof with an annular groove to receive an O-ring 121, which pervents oil leakage between the tubular casing 113 and the rod guide 118. As shown, the rod guide 118 is reduced in outer diameter adjacent to its bottom end and a cylinder 122 is fitted at its top end over the reduced-diameter bottom end portion of rod guide 118 with a driver element 123 disposed therebetween.

Fitted in the tubular casing 113 at the bottom end thereof is a bottom cap 124 through the intermediary of which the tubular casing 113 and yoke 111 are integrally welded together. Incorporated in the hollow inside of the bottom cap 124 is a bottom valve 125 which is so designed as to produce a damping force of selectable intensity upon compression of the damper 110 while allowing free passage of hydraulic oil during the expansion stroke of the damper. The structure of the bottom valve 125 will be described later in detail. The cylinder 122 is fitted at its bottom end in the bottom valve 125 by means of an "inro" formation so as to define an annular space between the tubular casing 113 and the cylinder 122.

Secured to the bottom end of piston rod 114 is a piston valve assembly 126 which is slidably received in the cylinder 122 to divide the interior space therein into an upper and a lower oil chamber 127 and 128 and includes a valve mechanism which allows free passage of hydraulic oil from the lower chamber 128 into the upper chamber 127 when the piston valve 126 descends and restrains any free passage of hydraulic oil from the upper chamber 127 into the lower chamber 128 when the piston valve 126 rises.

Figure 23:
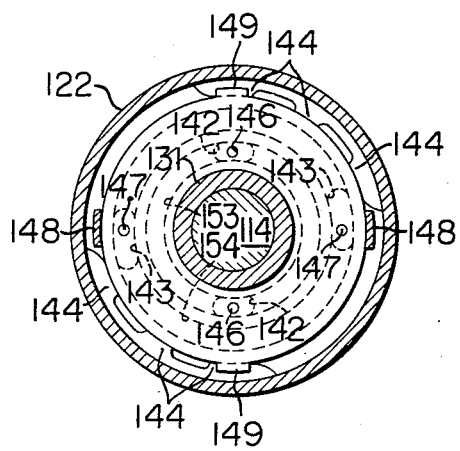
FIG. 23 is a transverse cross-sectional view taken along the line XXIII—XXIII in FIG. 22.

Reference will next be had to the upper half of FIG. 22 and FIG. 23, in which the structure of the piston valve assembly 126 is shown in detail.

The piston rod 114 has a reduced-diameter bottom end portion formed to define an annular shoulder 130 at the top thereof and on which end portion are fittingly assembled a number of components, including a rebound stop 131, a waved spring washer 132, a control plate 133, a piston 134, a collar 140, a valve plate 135, a spring retainer 136, a valve spring 137 and a washer plate 138 in the order named. These components are all secured together by means of a nut 139 which is threaded over the reduced-diameter portion of piston rod 114 at its bottom. In this assembly, the valve plate 135 and spring retainer 136 are arranged in concentric relation to the collar 140 for free sliding movement relative to the outer peripheral surface thereof. The nut 139 once threaded over the bottom end of the piston rod 114 under a prescribed magnitude of torque is additionally tightened in order to prevent it from working loose.

The piston 134 is provided around the outer periphery thereof with a seal means 141 which serves as a hydraulic seal between the upper and lower oil chambers 127 and 128 defined in the cylinder 122 by the piston 134. The piston 134 is formed in the bottom face inside of a depending skirt portion thereof as well as in the top face thereof with two concentric annular grooves 153–154 of 153'–154'. Of these annular grooves, four in all, the inner annular grooves 153, 153' are connected with each other by two axially extending oil passages 142 formed through the piston 134 and similarly the outer annular recesses 154, 154' are interconnected through two axially extending oil passages 143 formed in the piston 134. The two annular grooves 153–154 in the top face, when the control plate 133 is positioned as illustrated, are covered by the control plate while, of the annular grooves 153'–154' in the bottom face, only the inner one 153' is covered by the valve plate 135. That outer peripheral portion of piston 134 which extends over the piston seal 141 is arcuately recessed in a wavering fashion with a series of diametrally opposite depressions 144, in which a pair of anti-turn lugs or pawls 149 formed on the control plate 133 are resiliently fitted, as will be described later in further detail. A recess 145 is formed in the bottom end face of the downwardly extending skirt portion of piston 134 to serve as a positioning mark, as will be described hereinafter.

Figure 25:
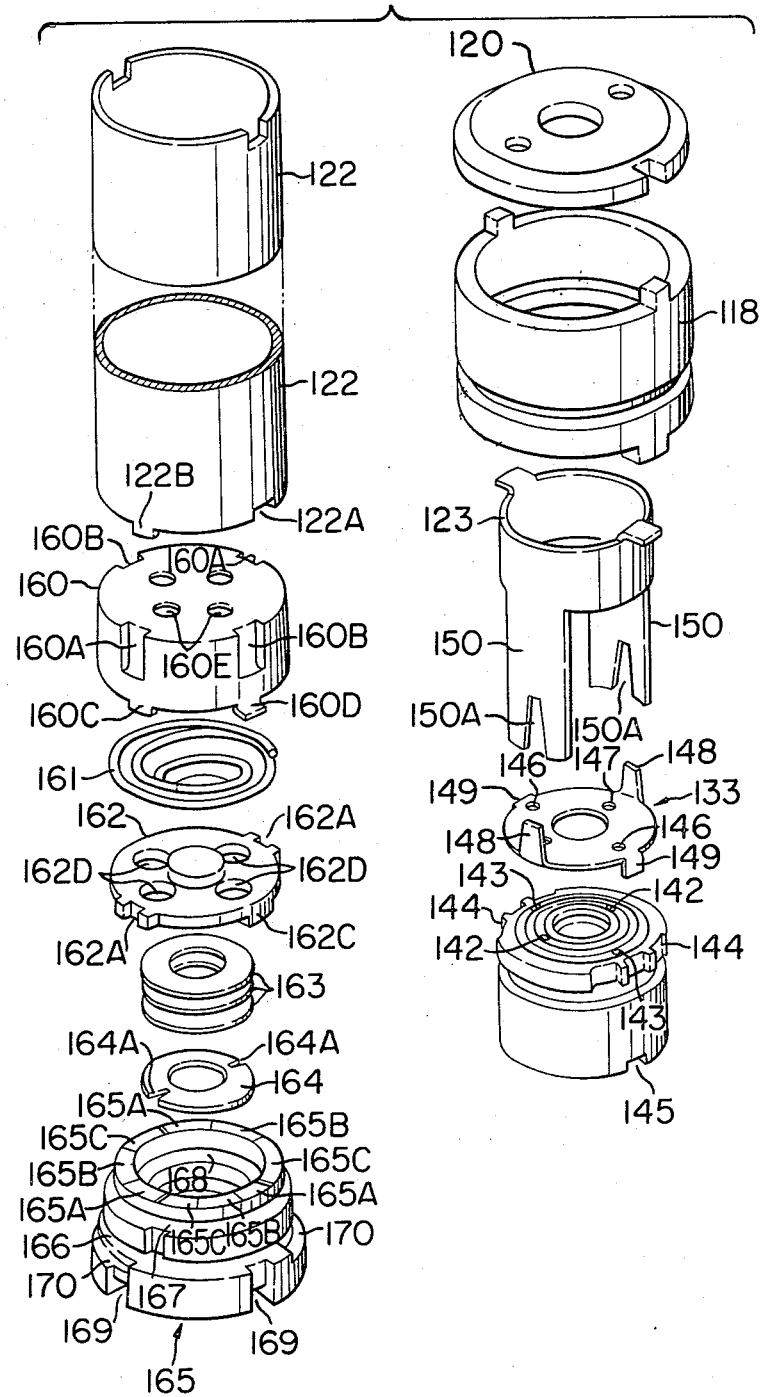
FIG. 25 is an exploded perspective view, showing the essential components of the shock absorber of FIG. 21 in the assembling order.

As clearly shown in FIG. 23, the control plate 133 is formed with two pairs of orifices 146 and 147 arranged on respective circles of the same diameters as those of the two annular grooves 153 and 154 formed in the top face of piston 134. The orifices 146 or 147 in each pair of such orifices are arranged in positions diametrally opposite to each other. As will be described later in detail, these orifices 146 and 147 are designed to control the damping force of the piston valve assembly 126 when the damper 110 is extended. Also, as shown in FIG. 25, the control plate 133 is formed along the outer periphery thereof with a pair of upturned lugs or pawls 148 and a pair of downturned lugs or pawls 149 in positions spaced 90 degrees from each other. The downturned pawls 149 are sprung into the depressions 144 formed in the top periphery of piston 134 to control the angular phase relation of the control plate 133 to the piston 134. On the other hand, the upturned pawls 148 are placed in engagement with respective slits 150A formed in a pair of downwardly extending fork-like pawls 150, which are formed on the drive element 123. The damper adjuster 120, rod guide 118 and driver element 123 are engaged with each other to form an intergral structure rotatable about the axis of the assembly. Therefore, when the damper adjuster 120 is turned from outside by appropriate tool means, its rotation is transmitted to the control plate 133 so that the latter is rotated relatively to the piston 134 about the axis thereof.

Referring next to FIGS. 21 and 22, a coiled rebound spring 152 is arranged between the rebound stop 131 and rod guide 118 in encircling relation to the piston rod 114 in order to alleviate the shock in rebounding.

In assembling the bracket 112 and piston 134 on the piston rod 114, they are accurately positioned relative to each other so that the recess 145 in the bottom end of the skirt portion of piston 134 is held in predetermined phase relation to a given line of radius of the bracket 112.

Figure 24:
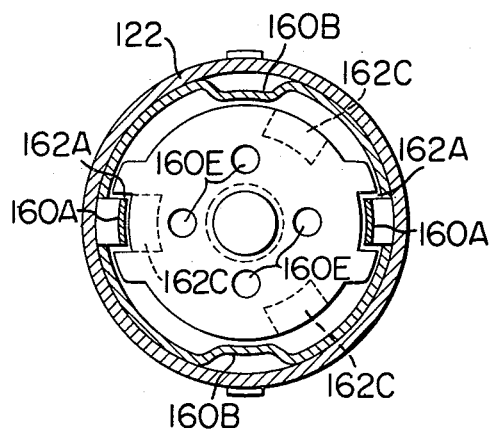
FIG. 24 is a view similar to FIG. 23, taken along the line XXIV—XXIV in FIG. 22.

Referring to the lower half of FIG. 22 and FIGS. 24 and 25, the bottom valve 125 is constituted of an adjuster cap 160, a one-way spring 161, an annular control element or tripod 162, a stack of control sheets 163, an orifice plate 164 and a bottom piece 165, as will be described below in detail.

The adjuster cap 160 has a pair of slitted groove-like depressions 160A formed in the top periphery thereof in positions spaced 180 degrees from each other and fitted in respective positioning recesses 162A formed in the periphery of control tripod 162. The adjuster cap 160 is also formed with another pair of similar depressions 160B in positions spaced 90 degrees with the depressions 160A to serve the purpose of axially guiding the control tripod 162. In this manner, the control tripod 162 is held against rotation relative to the adjuster cap 160 but is axially freely slidable relative thereto.

The lower portion of adjuster cap 160 extending below the depressions 160A and 160B is circular in cross section and carries along the bottom edge thereof a pair of radially inwardly bent pawls 160C which are vertically aligned with respective depressions 160A and a pair of radially outwardly bent pawls 160D which are vertically aligned with respective depressions 160B. The lower portion of adjuster cap 160, which is of circular cross section, is fitted in the cylinder 122 at the bottom thereof in hydraulically sealed relation thereto. The inturned pawls 160C are slidably fitted in a peripheral groove 166 formed around the outer periphery of bottom piece 165. In order to facilitate the assembling of the adjuster cap 160 on the bottom piece 165, the latter has a pair of axially extending grooves 167 formed in the outer peripheral surface thereof in positions circumferentially spaced 180 degrees from each other and opening at the bottom end to the peripheral groove 166. The axial grooves 167 are both of a width sufficient to allow passage of the inturned pawls 160C of adjuster cap 160 through such grooves into the annular groove 166. The outturned pawls 160D at the bottom of adjuster cap 160 are loosely fitted in respective slits 122A formed in the bottom edge of cylinder 122 so that the adjuster cap 160 and cylinder 122 are rotatable as an integral unit. The top wall of the adjuster cap 160 is generally flat and is formed therein with a set of four oil holes 160E.

The annular control element or tripod 162 is formed on the bottom face thereof with a central projection 162B, which is held tightly in contact with the inner peripheral edge of the topmost of control sheets 163, and three feet 162C, which are arranged at equal spacings along the outer periphery of the control element 162 and extend downwardly to one and the same horizontal plane. The tripod 162 is also formed therein with a set of four oil holes 162D, which extend vertically through the tripod 162.

The control sheets 163 are formed of spring steel or the like resilient sheet material and stacked together to form an annular disc. In cases of such stack formation, the number of sheets used therein is determined according to the characteristics required thereof. Arranged directly beneath the control disc 163 in superimposed relation thereto, the orifice plate 164 is substantially the same as the control sheets 163 in diameter as well as in thickness and is formed around the outer periphery thereof with a plurality of slits 164A. The orifice plate 164 is held around the periphery thereof in pressure contact with a seat face 168 defined on the bottom piece 165 under the bias of one-way spring 161. The bottom piece 165 is formed centrally thereof with an axial oil bore 171 which is conically enlarged at the top and connected at the bottom with a pair of diametral grooves 169, formed in the bottom face of bottom piece 165 and extending at right angles to each other. In this manner, the oil bore 171 is in fluid communication with the annular space around the cylinder 122 through the diametral grooves 169 crossing each other on the axis of the bottom piece 165. The bottom cap 124 is partly press-worked to form a rib 124A inside thereof and which rib is received in one of the bottom grooves 169 in the bottom piece 165 to hold the latter against rotation relative to the bottom cap 124.

As best shown in FIG. 25, the bottom piece 165 is formed at its top with three sets of flat surfaces 165A, 165B and 165C of successively different heights, which are arranged at regular intervals on a circle of substantially the same radius as the circle on which the feet 162C of control tripod 162 are arranged. The one-way spring 161 is so designed as to exert a spring force on the control tripod 162 which is smaller than the restoring force of the resilient control and orifice plates 163–164, which acts against the spring force. With this arrangement, the control sheets 163 are not deflected, remaining flat as shown in FIG. 22, as long as the oil pressure differential across the bottom valve 125 remains below a preset value. In the meantime, the feet 162C of control tripod 162 are held spaced a definite distance from the respective flat surfaces formed on top of the bottom piece 165 with the central projection 162B on the bottom of control tripod 162 remaining in contact with the stack of control and orifice plates 163–164 to close the through bore extending axially thereof. It is to be noted that the three feet 162C, arranged circumferentially at equal intervals and having the same axial length, are at all times held opposite to respective flat surfaces 165A, 165B or 165C of the bottom piece 165, which are of the same height, irrespective of the angular position of the control tripod 162 relative to the bottom piece 165.

When the damper adjuster 120 is driven to rotate by appropriate tool means, the cylinder 122, fitted at the top over the rod guide 118, is rotated about its own axis through the medium of the rod guide 118. As a consequence, the control tripod 162, which is held engaged with adjuster cap 160 held in engagement with the bottom end of cylinder 122, rotates about the axis thereof relatively to the bottom piece 165 and, accordingly, the distance of the feet 162C from the bottom piece 165 are changed stepwise as they are placed opposite to the flat surfaces 165A, 165B and 165C in succession.

Though, in the embodiment illustrated, the flat surfaces 165A, 165B and 165C on the top of bottom piece 165 are provided in three different heights and the distance of the feet 162C of control tripod 162 from the bottom piece 165 are variable in three steps, it will be readily understood that such flat surfaces may be provided in two or four or still more heights, if required, with the number of feet 162C correspondingly decreased or increased thereby to enable the distance between the control tripod 162 and bottom piece 165 to vary in two or four or still more steps. Further, if desired, the sets of flat surfaces 165A, 165B and 165C may be replaced by a single surface whose height varies continuously. As will readily be noted, the axial distance between the feet of control tripod 162 and the single top end surface of bottom piece 165 varies in a continuous fashion with rotation of the control tripod 162 relative to the bottom piece 165.

As seen in FIGS. 22 and 25, the bottom piece 165 is stepped partially around the outer periphery thereof directly below the peripheral groove 166 to form a pair of arcuate shoulders 170 which extend each in an angular range of approximately 90 degrees. It is to be understood that the opposite end walls of such arcuate shoulders 170 together serve as stop means for restraining any relative rotation between the cylinder 122 and bottom piece 165 beyond the angular range of the arcuate shoulders 170, to which the bottom projections 122B on the cylinder 122 are slidably fitted.

With the arrangement described above, when the damper adjuster 120 is turned by appropriate tool means, there arises in the piston valve 126 a relative rotation between the control disc or sheets 133 and the piston 134 and at the same time there arises in the bottom valve 125 a relative rotation between the bottom piece 165 and control tripod 162. As will be readily noted, the resulting relative angular positions of these components are kept free from any disturbance unless the damper adjuster 120 is again driven to rotate because of the resilient engagement of the pawls 149 of control plate 133 in the respective depressions 144 formed in piston 134.

Upon operation of the piston valve 126, that is, upon relative rotation between control plate 133 and piston 134, the effective lengths of annular grooves 153 and 154, which are arranged respectively between orifice 146 and oil passage 142 and between orifice 147 and oil passage 143 for fluid communication therebetween, vary in a range corresponding to the range of phase difference of 0° to 90° and, accordingly, the resistance of the annular grooves 153 and 154 to oil flow therethrough varies, causing a corresponding variation in damping force of the damper unit 110 when extended.

Figure 26:
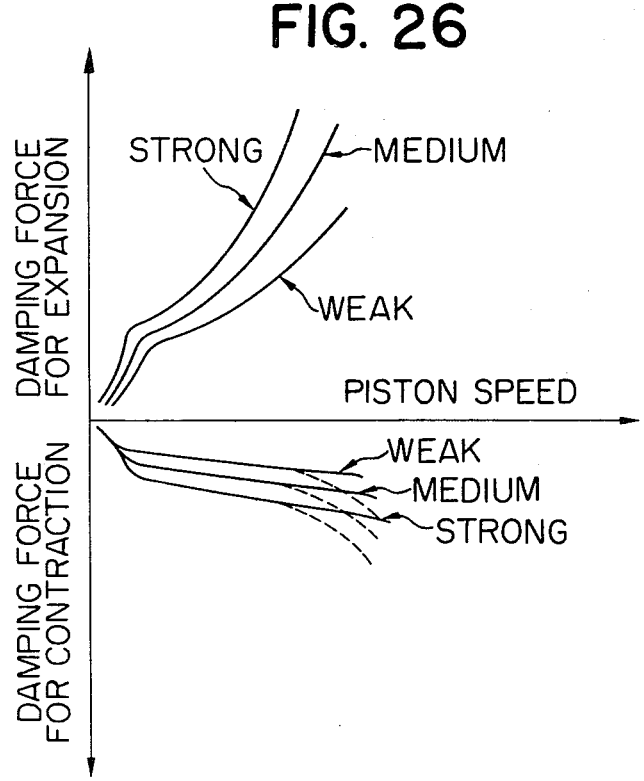
FIG. 26 is a damping characteristic curve diagram of the shock absorber shown in FIG. 21.

FIG. 26 is a diagram illustrating the damping characteristics of the above-described form of damper, in which the abscissa represents the piston speed and the ordinate in the upper region represents the expansion damping force, that in the lower region representing the compression damping force. As observed in this diagram, the damping characteristic of the damper 110 when expanded is shifted successively upward from the bottom line ("weak") to the top line ("strong") through the intermediate line ("medium") as the flow resistance of annular grooves 153 and 154 is increased.

Referring again to FIG. 22, when the piston 34 rises in the expansion stroke, the control tripod 162 in the bottom valve assembly 125 is raised against the bias of one-way spring 161, which is comparatively small, to allow free flow of hydraulic oil from the annular space defined around the cylinder 122 into the lower oil chamber 128 therein so that there is no occurrence of any substantial damping force.

On the other hand, when the piston 134 is lowered in the compression stroke, the control disc 163 and orifice plate 164 are held in close contact with the respective seat surfaces, as shown in FIG. 22 so that there occurs a damping force as determined by the orifices in the form of slits 164A in the orifice plate 164. The damping characteristic curve in this instance, therefore, generally takes a quadratic form, as indicated in FIG. 26 at a.

If the speed of descent of piston 134 is increased to such an extent that the oil pressure differential across the bottom valve 125 exceeds a first preset value, the oil flow through the orifices or slits 164A in the orifice plate 164 is accordingly increased so that the control sheets 163 begin to deflect into dish form and finally the feet 162C of control tripod 162 come into contact with the top end face of the bottom piece 165. The control tripod 162 can now no longer descend despite of the downward urge of one-way spring 161. In this connection, the distance between the feet 162C of control tripod 162 and the top end face of bottom piece 165 and hence the amount of initial deflection of the control sheets 163 are variable in accordance with the angular setting given to the bottom piece 165 by turning the damper adjuster 120, in a stepwise fashion owing to the stepped top end formation (165A, 165B, 165C) of the bottom piece 165 or, if desired, in a continuous fashion with an appropriate continuous top end formation thereof.

Subsequently, as the speed of descent of piston 134 is further increased, the control disc 163 is further deflected and separates from the seat surface of the central projection 162B on the control tripod 162 when the oil pressure differential across the bottom valve 125 exceeds a second preset value. At this time, the damping characteristic curve is flexed from its quadratic portion a in FIG. 26 to rise at a reduced rate. The position of the flex point of the damping characteristic curve depends upon the lower limit position of the seat surface of central projection 162B on the control tripod 162. This means that the damping characteristic can be changed by varying the lower limit position of the control tripod 162 with the aid of the stepped top end formation of the bottom piece 165.

In cases where the speed of descent of the piston 134 is increased still further, the damping characteristic may be readily adjusted, if desired, so that the damping force is increased in such a manner as indicated in FIG. 26 by the broken lines by providing appropriate means (not shown) for restricting the axial oil bore 171 formed in the bottom piece 171.

Figure 27:
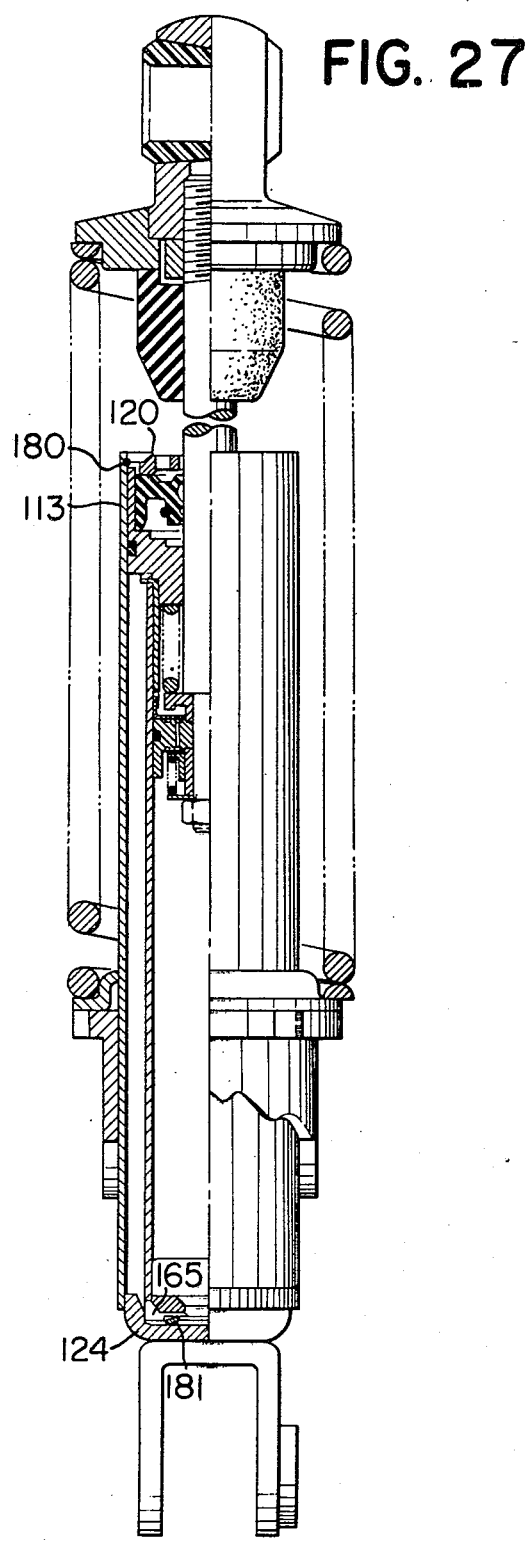
FIG. 27 is a view similar to FIG. 21, showing a modification of the shock absorber of FIG. 21.

A modification of the embodiment illustrated in FIGS. 21 to 25 is shown in FIG. 27. In this modification, a circlip 180 is interposed between the damper adjuster 120 and tubular casing 113 of the damper to hold the adjuster 120 and associated parts in place thereby to make it possible to obtain a desired definite level of friction between the damper adjuster 120 and the tubular casing 113 while enabling disassembling of the damper adjuster 120 and associated parts. Further, in order to ensure contacting engagement between the circlip 180 and associated parts, a conical spring washer 181 of substantial stiffness is inserted between the bottom piece 165 and bottom cap 124 thereby to apply a substantial upward thrust to the calked top edge portion of tubular casing 113. The remaining components of this modified form of damper are quite the same in structure as those used in the embodiment shown in FIGS. 21 to 25.

In the embodiment of FIGS. 21 to 25 and its modification of FIG. 27, the damper 110 constitutes a shock absorber of the present invention; and the rod guide 118, damper adjuster 120 and driver 123 together form a rotating means of the shock absorber; the piston valve 126 and bottom valve 125 respectively forming a first and a second damping mechanism of the shock absorber. The depressions 144 in piston 134 and the pawls 149 on control plate 133 jointly constitute rotation-restraining means of the shock absorber; the control tripod 163 forms a valve-element presser member of the shock absorber; the stack of control sheets 163 and orifice plate 164, cooperating with each other, form a valve element of the shock absorber; the bottom piece 165 forms a valve-seat member for the valve element; and the sets of flat surfaces 165A, 165B and 165C on top of the bottom piece 165 together serve as means for controlling the amount of axial displacement of the valve-element presser and hence of the valve element in the shock absorber of the present invention.

According to these embodiments, the shock absorber is provided with a first damping mechanism for damping expanding movement and a second damping mechanism for damping compression movement of the shock absorber, each of such mechanisms being capable of exhibiting various damping characteristics for movement in the direction concerned despite of its simple structure. Because of this, the shock absorber is not only simple in structure and easy to assemble, allowing ready renewal of parts as required, but is also reliable in operation and can readily put into practical application. In addition, the first and second damping mechanisms are designed individually to serve their own functions and their damping characteristics are readily adjustable by simple operation.

In particular, the second damping mechanism, including a valve-seat member, a valve element, a valve-element presser and a displacement control means, each obtainable in simple form, is itself itself reliable in operation and easy to assemble, allowing ready replacement of parts when required, and enables the weight of the whole assembly to be reduced to an extreme extent.

Further, it is to be noted that, among others, the valve element is deflexible in cooperation with the valve-element presser and the displacement controlling means in a precise and reliable fashion according to the magnitude of oil pressure differential across the second damping mechanism, that is, according to whether the oil pressure differential remains below a first preset value, exceeds the first preset value while remaining below a second preset value, or exceed the second preset value. Owing to this, the flow of hydraulic oil through the valve unit can be closely controlled in an effective manner so as to enable the damper to have its damping characteristics efficiently controlled as required.

In addition, since the displacement controlling means is designed to variably control the amount of axial displacement of the valve-element presser member toward the valve-seat member, the damping characteristics of the shock absorber can be freely varied as desired according to the driving conditions such as the load condition of the vehicle associated and the road surface conditions.

What is claimed is:

1. An improved shock absorber for vehicle use of the type having in combination, a cylinder filled with hydraulic oil and a piston slidably fitted therein, being formed with a piston rod, and arranged between members of a vehicle suspension system, respectively associated with the body of the vehicle and a wheel assembly thereof, said cylinder having a head portion supported on one of said members and a free end portion of said piston rod supported on the other of said members, to thereby moderate the force of impact due to relative movement between said members, first and second oil chambers defined in said cylinder by said piston; at least one oil passage formed in said piston extending therethrough to communicate with said first and second oil chambers; said improvement comprising: a valve mechanism provided in association with said piston for controlling the flow of oil through said oil passage; and adjusting mechanism for adjusting the operating characteristic of said valve mechanism from outside of said cylinder; said valve mechanism being defined by: a resilient plate-like valve element arranged in a position adjacent to one of the end openings of said oil passage responsive to an oil pressure differential between said first and second oil chambers; valve-element support means movable in response to deflection of said valve element for holding the latter in a closed position as long as the amount of deflection of said valve element is not greater than a preset value and adapted to be held against any further movement, said valve element being adapted to assume an open state with clearance defined between said valve-element support means and at least part of the peripheral region of said valve element in (59,59', 104) correspondence with the amount of deflection of said valve element when the amount of deflection of said valve element exceeds said present valve, orifice means for allowing a preset flow of oil through said oil passage when said valve element is in a closed position; and control means adapted to selectively limit the extent of movement of said valve-element support means by said adjusting mechanism; said valve element is further defined as an annular valve member formed of resilient sheet material and arranged coaxially with said piston, in which said valve-element support means is defined by a first annular valve-seat member for supporting the outer peripheral edge portion of said valve element on one face thereof and a second annular valve-seat member for supporting the inner peripheral edge portion of said valve element on the other face thereof; one of said valve-seal members has controlling surfaces arranged thereon along a circle concentric with and of a different radius from the annular valve seat thereof, said controlling surfaces respectively increasing successively in height at a fixed rate in a circumferential direction of the valve-seat member while the other valve-seat member has feet means formed thereon along a circle concentric with and different in radius from the annular valve seat thereof, in positions corresponding to said controlling surfaces which are of the same height, including one in each of said controlling surfaces, said feet means extending the same direction from said other valve-seat member toward said controlling surfaces and in which said one valve-seat member is arranged for rotation about the axis of said valve-element support means, the axial distance of said feet from said controlling surfaces is varied uniformly when said one valve-seat member is rotated relative to the other valve-seat member by said adjusting mechanism and an adjusting-torque transmitting spring is provided which is held in integral engagement with said second annular valve-seat member, including at least one projecting portion and one engaging portion engageable with a driver element of said adjusting mechanism, said projecting portion being formed so as to resiliently fall into a selected one of a plurality of recesses formed in the outer peripheral surface of said piston rod or of a member restrained thereon, so as to be rotatable relative thereto in positions circumferentially adjacent to each other, as said second valve-seat member is rotated relative to said first valve-seat member by operation of said adjusting mechanism.

2. An improved shock absorber as set forth in claim 1, wherein: said first annular valve-seat member is formed integral with said piston and said second annular valve-seat member is mounted on said piston rod directly or through the intermediary of another member.

3. An improved shock absorber as set forth in claim 2, wherein: a tubular control element is fitted around the outer peripheral surface of said piston rod and is operatively associated with said first valve-seat member and said second valve-seat member so that said first valve-seat member is axially movable relative to said piston rod over a preset distance, while said second valve-seat member is axially movable relative to said piston rod over a preset distance different from that preset for said first valve-seat member.

4. An improved shock absorber as set forth in claims 1 wherein: said valve element is formed of a plurality of annular resilient sheets overlying each other and radially recessed groove means which form at least part of said orifice means in cooperation with the valve seat region of said first or second valve-seat member.

5. An improved shock absorber for vehicle use as set forth in claim 1 wherein: at least one of said first and second annular valve-seat members is formed thereon with controlling projection means for defining maximum deflection of said valve element.

6. An improved shock absorber as set forth in claim 1, wherein: at least one of said recesses is formed in a substantial length axially of said piston rod and said second valve-seat member is formed therein with a plurality of small apertures of different cross-sectional areas for intercommunicating the oil spaces on the opposite sides of said valve element irrespective of the operating condition thereof whereby; rotation of said second valve-seat member relative to said first valve-seat member enables one of said small apertures to be selectively placed in fluid communication with one of said recesses, having a substantial length axially of said piston rod, to thereby complete said orifice means.

7. An improved shock absorber as set forth in claim 1, wherein; one or more of said recesses are formed in a substantial length axially of said piston rod and a control element is formed therein with one or more small apetures for communicating with the oil spaces on opposite sides of said valve, element irrespective of the operating condition, said control element being arranged to rotate together with said second valve-seat member, as the latter is rotated relative to said first valve-seat member, causing said small apertures forming said orifice means to completely close or one or more thereof are selectively placed in fluid communication with one or more of said recesses having a substantial axial length.

* * * * *